(12) United States Patent
Eberle

(10) Patent No.: US 10,906,635 B2
(45) Date of Patent: Feb. 2, 2021

(54) VIBRATION CONTROL ASSEMBLY

(71) Applicant: Sikorsky Aircraft Corporation, Stratford, CT (US)

(72) Inventor: Stephen Eberle, Waterford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 311 days.

(21) Appl. No.: 16/062,768

(22) PCT Filed: Dec. 14, 2016

(86) PCT No.: PCT/US2016/066509
§ 371 (c)(1),
(2) Date: Jun. 15, 2018

(87) PCT Pub. No.: WO2017/116705
PCT Pub. Date: Jul. 6, 2017

(65) Prior Publication Data
US 2020/0255127 A1 Aug. 13, 2020

Related U.S. Application Data

(60) Provisional application No. 62/273,518, filed on Dec. 31, 2015.

(51) Int. Cl.
*B64C 17/06* (2006.01)
*B64C 27/00* (2006.01)
*B64C 27/04* (2006.01)

(52) U.S. Cl.
CPC ............ *B64C 17/06* (2013.01); *B64C 27/001* (2013.01); *B64C 27/04* (2013.01)

(58) Field of Classification Search
CPC ........ B64C 17/06; B64C 27/001; B64C 27/04
See application file for complete search history.

(56) References Cited

U.S. PATENT DOCUMENTS 3,265,335 A * 8/1966 McPherson ............. B64C 17/06
244/79
4,518,313 A * 5/1985 Jensen .................. B64C 27/001
416/18

(Continued)

OTHER PUBLICATIONS

International Search Report for International Application No. PCT/US2016/66509; dated Mar. 2, 2017; 8 pages.

(Continued)

*Primary Examiner* — Justin M Benedik
(74) *Attorney, Agent, or Firm* — Foley & Lardner LLP

(57) ABSTRACT

A vibration control assembly for an aircraft includes a housing operatively coupled to the aircraft. Also included is a cage disposed within an interior region of the housing, the cage rotatable within the housing about a first axis. Further included is a gyroscope wheel disposed within the cage and rotatable about a second axis other than the first axis, wherein a controllable moment is imposed on the aircraft upon rotation of the gyroscope wheel to counter vibratory moments produced by the vehicle. Yet further included is a control assembly at least partially surrounding the gyroscope wheel for controlling the controllable moment. The control assembly includes a structure having an inner surface, a track disposed along the inner surface, and an arm operatively coupled to the gyroscope wheel, the arm having an end disposed within the track, the gyroscope wheel angularly displaceable upon translation of the arm along the track.

19 Claims, 12 Drawing Sheets

(56) References Cited

U.S. PATENT DOCUMENTS

| | | | | |
|---|---|---|---|---|
| 5,437,420 A | * | 8/1995 | Rosen | B64G 1/285 244/165 |
| 8,042,659 B1 | * | 10/2011 | Welsh | F16F 15/366 188/267.2 |
| 2013/0133445 A1 | * | 5/2013 | Heiberg | G01C 19/02 74/5.34 |

OTHER PUBLICATIONS

Written Opinion of the International Search Report for International Application No. PCT/US2016/66509; dated Mar. 2, 2017; 5 pages.

* cited by examiner

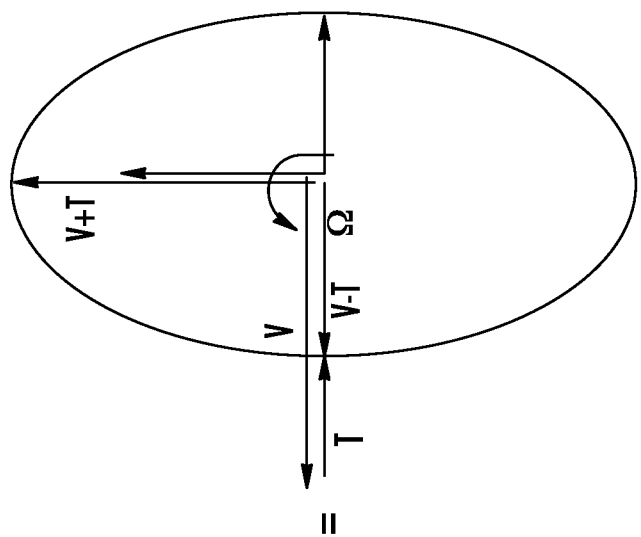
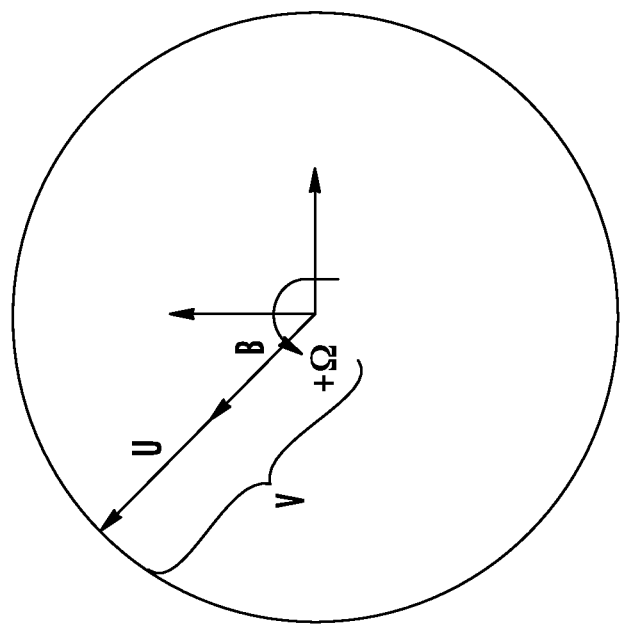
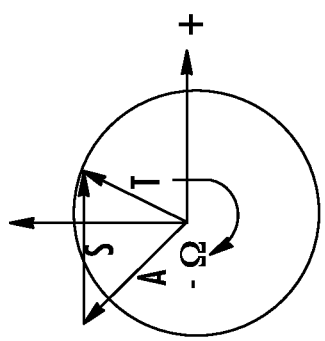
FIG. 7

VIBRATION CONTROL ASSEMBLY

CROSS REFERENCE TO RELATED APPLICATIONS

This application is a National Stage application of PCT/US2016/066509, filed Dec. 14, 2016, which claims the benefit of U.S. Provisional Application No. 62/273,518 filed Dec. 31, 2015, both of which are incorporated by reference in their entireties herein.

BACKGROUND OF THE DISCLOSURE

The embodiments herein generally relate to aircrafts and, more particularly, to a vibration control assembly for an aircraft and methods of controlling aircraft vibration with one or more gyroscope assemblies.

Helicopter rotors produce undesirable vibratory hub moments that cause unwanted fuselage vibration. The largest moments are in the pitching and rolling moment directions. These moments produce an elliptical shape as time progresses. More generally, there are three moments which produce an ellipsoidal shape. Typically, active vibration control techniques use linear vibratory force actuators placed some distance apart in order to create a countering or anti-vibration moment. This approach undesirably adds significant weight because the linear actuators rely upon linearly oscillating a parasitic mass to generate load. However, the amplitudes of mass oscillation are limited due to space or other constraints, resulting in heavy designs that are deemed inefficient based on the moment produced relative to the weight. The reduction in payload capability of the aircraft is not desirably offset by the benefits associated with the counter-moment effects.

BRIEF DESCRIPTION OF THE DISCLOSURE

According to one embodiment, a vibration control assembly for an aircraft is provided. The assembly includes a housing operatively coupled to the aircraft. Also included is a cage disposed within an interior region of the housing, the cage rotatable within the housing about a first axis. Further included is a gyroscope wheel disposed within the cage and rotatable about a second axis other than the first axis, wherein a controllable moment is imposed on the aircraft upon rotation of the gyroscope wheel to counter vibratory moments produced by the vehicle. Yet further included is a control assembly at least partially surrounding the gyroscope wheel for controlling the controllable moment. The control assembly includes a structure having an inner surface, a track disposed along the inner surface, and an arm operatively coupled to the gyroscope wheel, the arm having an end disposed within the track, the gyroscope wheel angularly displaceable upon translation of the arm along the track.

In addition to one or more of the features described above, or as an alternative, further embodiments may include that the structure comprises a domed geometry.

In addition to one or more of the features described above, or as an alternative, further embodiments may include that the structure rotates synchronously with the gyroscope wheel.

In addition to one or more of the features described above, or as an alternative, further embodiments may include that the track extends along the inner surface of the structure in a spiral path.

In addition to one or more of the features described above, or as an alternative, further embodiments may include that the gyroscope wheel is angularly displaceable over a 90 degree range.

In addition to one or more of the features described above, or as an alternative, further embodiments may include that the control assembly further comprises a fin extending from an outer surface of the structure and a braking mechanism disposed proximate the fin and engageable therewith to control a rotational speed of the structure.

In addition to one or more of the features described above, or as an alternative, further embodiments may include that the fin extends around at least a portion of a base of the structure.

In addition to one or more of the features described above, or as an alternative, further embodiments may include that the braking mechanism is an electric braking mechanism and is a regenerative brake that is configured to store energy during braking.

In addition to one or more of the features described above, or as an alternative, further embodiments may include a motor operatively coupled to the cage with a motor shaft to rotate the cage and to control precession of the vibration control assembly.

In addition to one or more of the features described above, or as an alternative, further embodiments may include that the motor is operatively coupled to the gyroscope wheel and drives rotation of the gyroscope wheel.

In addition to one or more of the features described above, or as an alternative, further embodiments may include that the motor is at least partially powered by energy generated by the regenerative brake of the braking mechanism.

According to another embodiment, a method of controlling vibration on an aircraft is provided. The method includes rotating a cage about a cage axis, the cage disposed within a housing. The method also includes rotating a gyroscope wheel about a gyroscope wheel axis that is non-parallel to the cage axis, the gyroscope wheel disposed within the cage. The method further includes producing a moment on the aircraft upon rotating the gyroscope wheel, wherein the cage and gyroscope wheel partially form a first vibration control assembly. The method yet further includes controlling the moment produced by controlling an angular orientation of the gyroscope wheel.

In addition to one or more of the features described above, or as an alternative, further embodiments may include that the angular orientation of the gyroscope wheel is controlled by translating an arm operatively coupled to the gyroscope wheel along a track formed along an inner surface of a structure that partially surrounds the gyroscope wheel.

In addition to one or more of the features described above, or as an alternative, further embodiments may include that the structure and the gyroscope wheel are rotated synchronously.

In addition to one or more of the features described above, or as an alternative, further embodiments may include that the rotational speed of the structure is controlled with a braking mechanism that applies a braking force to the structure.

In addition to one or more of the features described above, or as an alternative, further embodiments may include that a power source is provided power with energy generated by the braking force applied to the structure.

In addition to one or more of the features described above, or as an alternative, further embodiments may include controlling the moment produced on the aircraft by varying a rotational speed of the gyroscope wheel

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

FIG. 7 illustrates instantaneous moment vectors of four vibration control assemblies and their summed moment path to counter vibratory moments;

DETAILED DESCRIPTION OF THE DISCLOSURE

Figure 1:
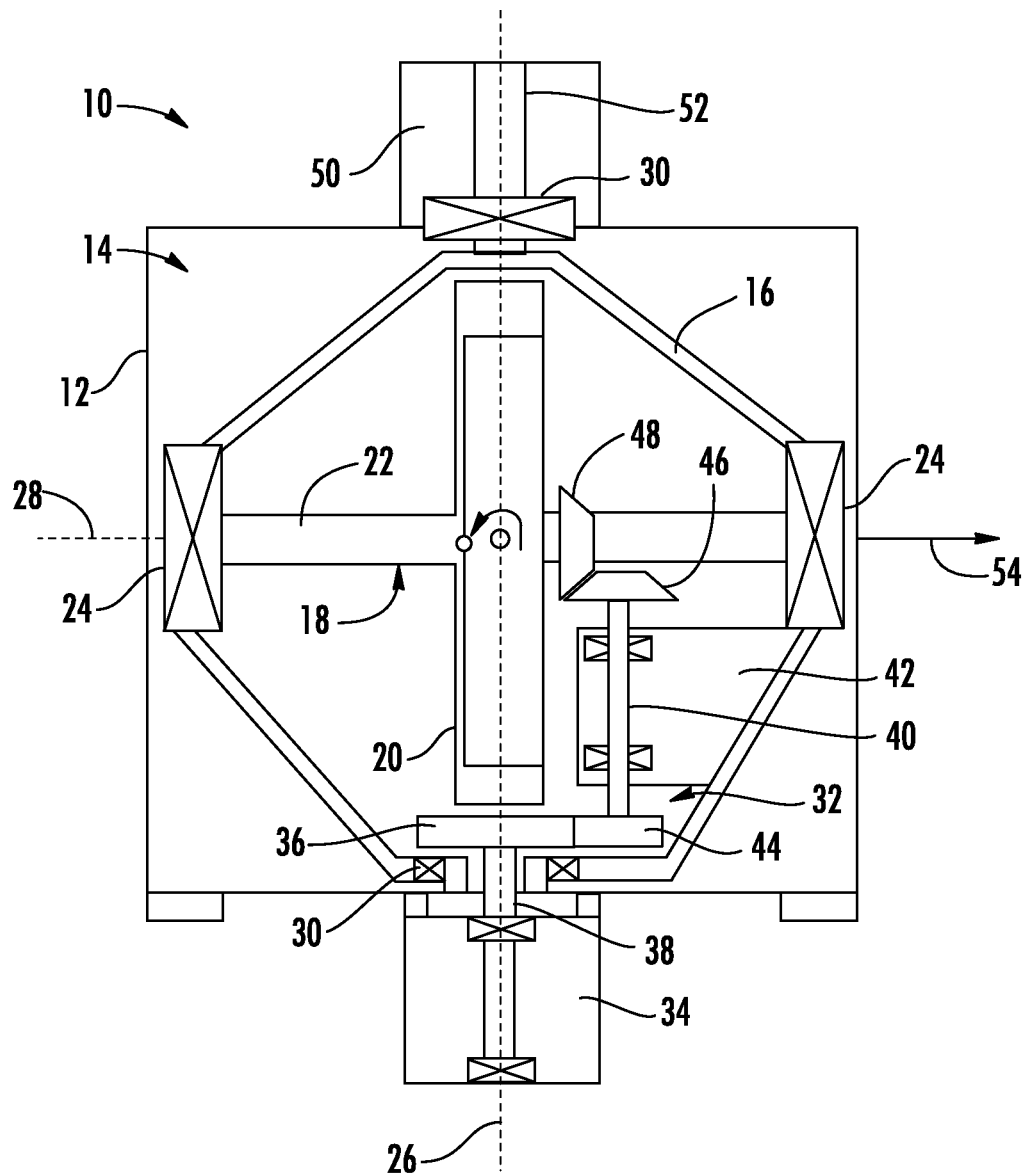
FIG. 1 is a vibration control assembly according to an embodiment of the invention.

Referring to FIG. 1, illustrated is an active vibration control system that employs one or more vibratory control moment gyroscopes, also referred to herein as a vibration control assembly 10. The vibration control assembly 10 is illustrated according to one embodiment in FIG. 1. It is contemplated that any structure, particularly vehicles, that inherently produces vibration may benefit from the counteracting vibratory forces of the embodiments described herein. One such structure is an aircraft, such as a helicopter that is subjected to vibration due to moments generated by a rotor. The vibration control assembly 10 counters the vibratory moments to reduce overall vibrations that the structure (e.g., aircraft) is subjected to. In the case of a helicopter, the vibration control assembly 10 may be operatively coupled to a location proximate the main transmission.

The vibration control assembly 10 includes a housing 12 that is operatively coupled to the structure that is to undergo vibration reduction. The housing may be operatively coupled to the structure in any suitable manner, including mounting with mechanical fasteners or welded thereto. The housing 12 defines an interior region 14. A cage 16 is disposed within the interior region 14. In the illustrated embodiment, the cage 16 is formed of an octagon cross-section, but it is to be appreciated that various alternative geometries may be employed. Irrespective of the geometry of the cage 16, a gyroscope wheel 18 is disposed within the cage 16. The gyroscope wheel 18 includes a wheel segment 20 and a gyroscope shaft 22, with the gyroscope shaft 22 coupled to the cage 16 at both ends. Gyroscope bearings 24 are included at both ends of the gyroscope shaft 22 to retain the gyroscope wheel 18.

The cage 16 is rotatable within the housing 12 about a first axis 26 and the gyroscope wheel 18 is rotatable within the cage 16 about a second axis 28. The gyroscope bearings 24 are low friction bearings that allow the gyroscope wheel 18 to rotate at a high rate (e.g., up to 20,000 rpm), while also carrying a resulting gyroscopic moment that is produced. The rotation of the gyroscope wheel 18 produces a moment that passes through the gyroscope bearings 24, through the cage 16 and into cage bearings 30 that are located at opposite ends of the cage 16 proximate an interface between the cage 16 and the housing 12. The moment is then passed to the housing 12 and subsequently to the structure that the housing 12 is mounted to, thereby countering moments produced by the structure itself. The physics and dynamics of the countering will be described in detail below.

A planetary gear arrangement 32 is employed to facilitate rotation of the gyroscope shaft 22 by operatively coupling the gyroscope shaft 22 to a driving source, thereby transmitting power to the planetary gear arrangement 32. In the illustrated embodiment, the driving source is a motor 34 that may be an electric or hydraulic motor. Other driving sources are contemplated. For example, a mechanical variable speed take off from the main transmission may be employed, such that the driving source is not only electrical or hydraulic. The motor 34 is operatively coupled to a sun gear 36 with a motor shaft 38 that penetrates the housing 12 and the cage 16. A planet gear shaft 40 is retained within a gear retainer 42 within the cage 16 and includes a first planet gear 44 and a second planet gear 46. The first planet gear 44 is disposed in contact with the sun gear 36 and the second planet gear 46 is disposed in contact with a drive gear 48 that is coupled to the gyroscope shaft 22. This arrangement converts power from the motor 34 to rotational motion of the gyroscope shaft 22 about the second axis 28 and hence the gyroscope wheel 18. The motor speed varies dynamically between 0 and about 20,000 rpm depending upon desired moment output which is monitored and controlled by an outer-loop anti-vibration controller.

As noted above, the cage 16 is rotatable about a first axis 26. Rotation of the cage 16 is driven by a motor 50. The motor 50 includes a motor shaft 52 that is configured to penetrate the housing 12 and is operatively coupled to the cage 16. The rotational speed and phase of the motor 50 is controllable. As will be appreciated, rotation of the cage 16 controls precession of the gyroscope wheel 18. As the cage 16 is rotated, the gyroscope wheel 18 and the planetary gear arrangement 32 rotate with the cage 16, imparting precession of the gyroscope wheel 18. The combination of rotation of the gyroscope wheel 18 and the cage 16 generates a gyroscopic moment 54. The magnitude of the gyroscopic moment 54 is equal to the product of the precession speed, the gyroscope wheel speed and the mass moment of inertia of the gyroscope wheel.

In the illustrated embodiment, the sun gear 36 and the motor shaft 38 are coaxially aligned with each other and with the first axis 26 that the cage 16 rotates about. The first axis 26 coincides with the axis of rotation of the motor shaft 52. As the planet gears 44, 46 rotate, they orbit the sun gear 36. Motor torque is thus transmitted to the drive gear 48 that drives the gyroscope wheel 18. As torque is transmitted continuously to the planet gear 46, it transmits torque directly to the gyroscope shaft 22. Such an embodiment avoids the need for a rotating motor directly connected to the gyroscope wheel 18 to spin the gyroscope wheel 18, as well as obviates the need for slip rings to power such a motor.

Figure 2:
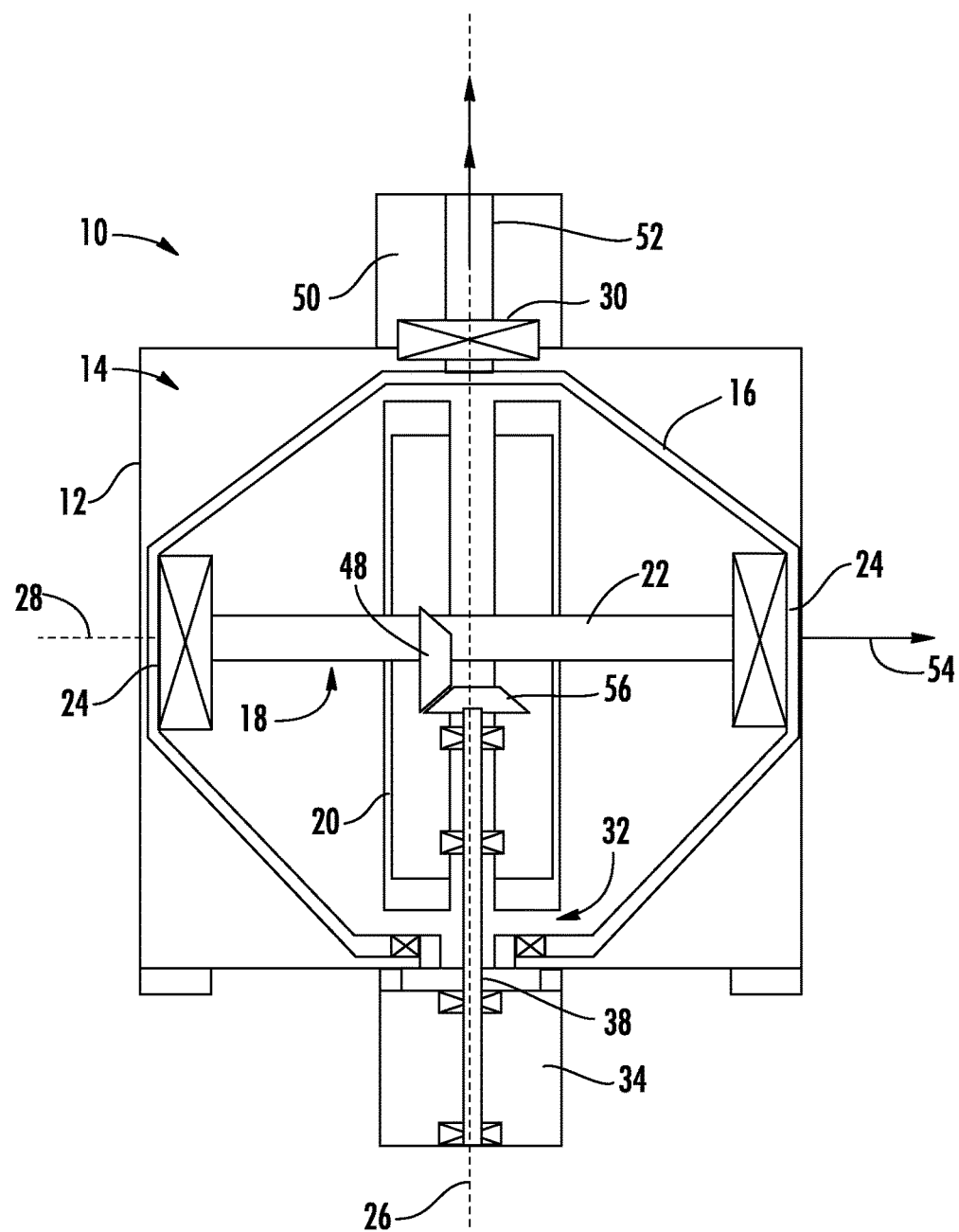
FIG. 2 is the vibration control assembly according to another embodiment of the invention.

Referring to FIG. 2, an alternative embodiment of the vibration control assembly 10 is illustrated. In particular, the planetary gear arrangement 32 is simplified. The motor 34 includes the motor shaft 38 that extends through the housing 12 and the cage 16 into close proximity with the gyroscope shaft 22 and has a gear 56 coupled thereto. The gear 56 is connected to the drive gear 48, which directly rotates the gyroscope shaft 22.

Figure 3:
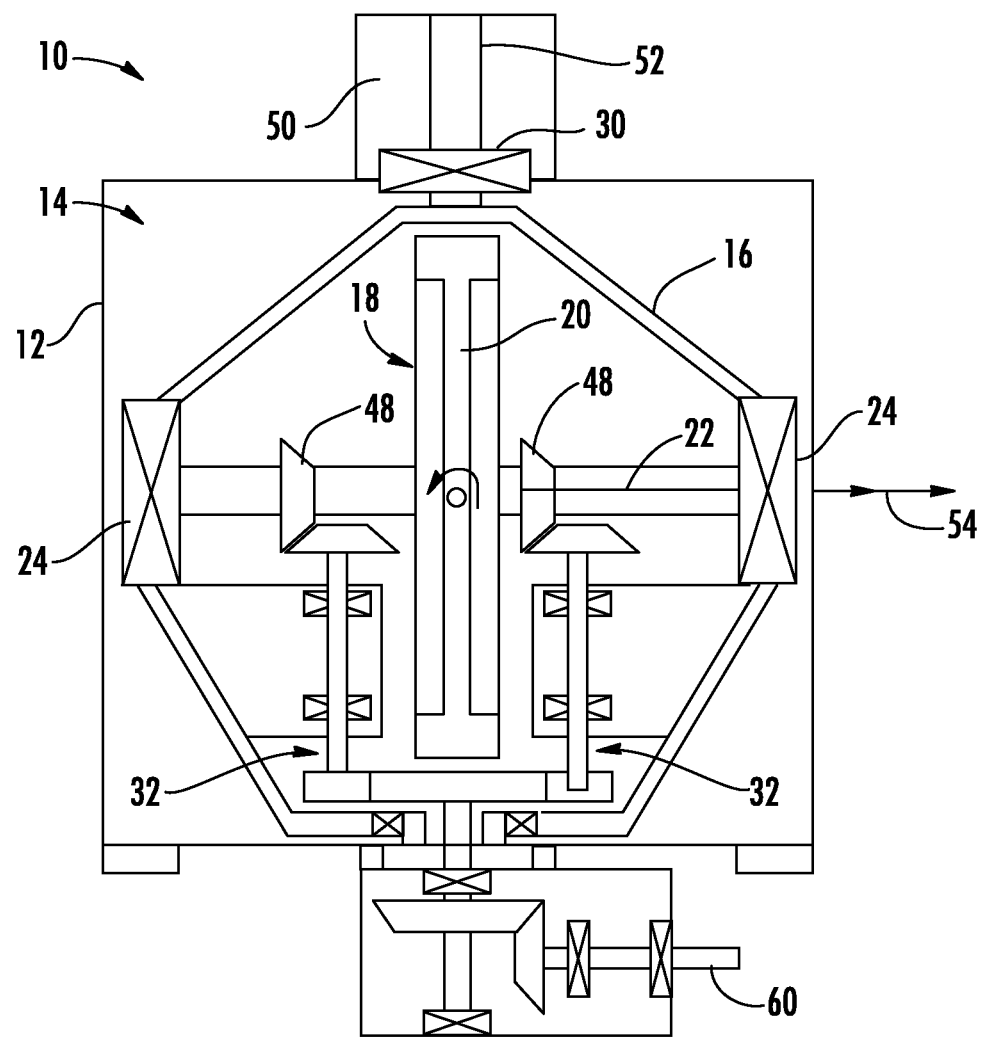
FIG. 3 is the vibration control assembly according to yet another embodiment of the invention.

Referring to FIG. 3, yet another embodiment of the vibration control assembly 10 is illustrated. As shown, power may be transmitted to the gyroscope shaft 22 without a dedicated motor. Specifically, a gearbox shaft 60 that extends from an existing gearbox of the vehicle, such as a main rotor gearbox of a helicopter. The gearbox shaft 60 is powered by an existing power source and is simply disposed in contact with the planetary gear arrangement 32 illustrated. The planetary gear arrangement 32 of FIG. 3 includes two planet gear shafts 40 that are both coupled to the sun gear 36. The embodiment described above and illustrated is merely exemplary, as one can appreciate that fewer or more planet gear shafts 40 may be employed.

Figure 4:
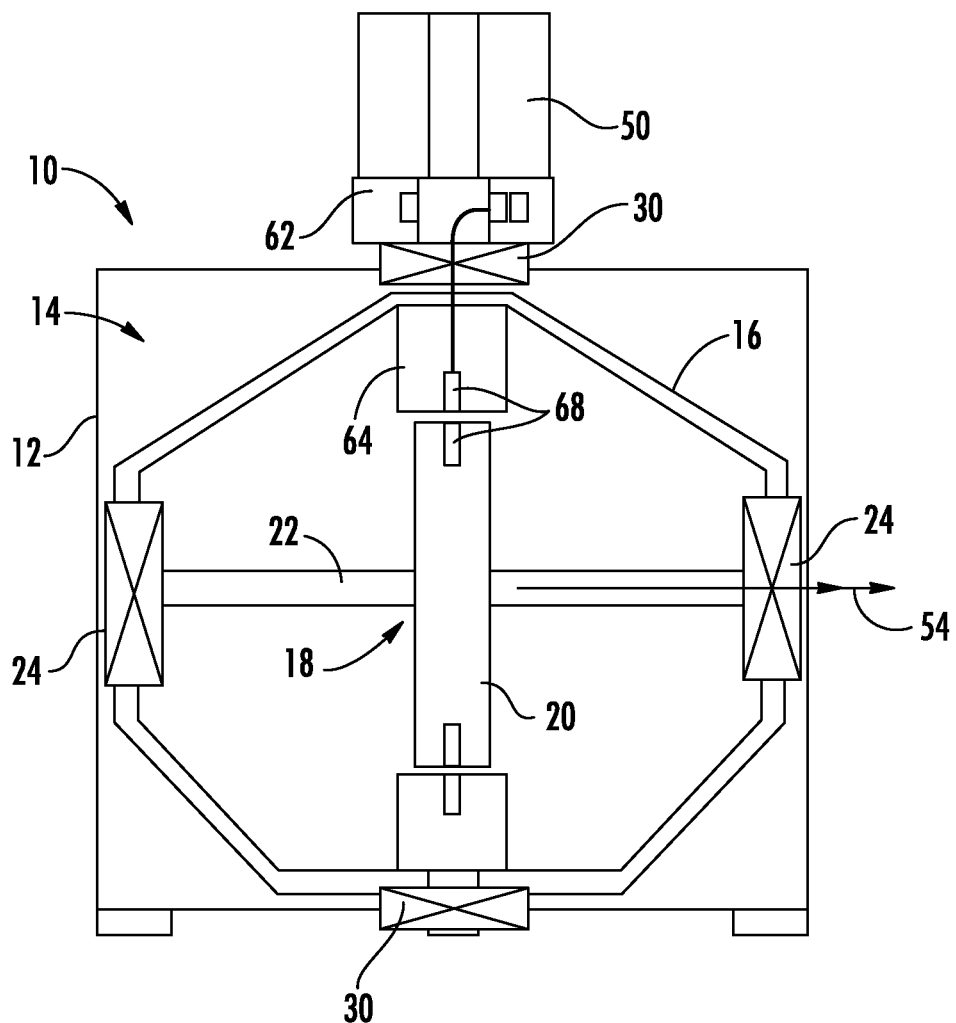
FIG. 4 is the vibration control assembly according to yet another embodiment of the invention.

Referring to FIG. 4, another embodiment of the vibration control assembly 10 is shown. In the illustrated embodiment, the motor 50 drives rotation of both the cage 16 and the gyroscope wheel 18. To facilitate the additional rotation of the gyroscope wheel 18, a slip ring 62 is disposed between the motor 50 and the cage 16. Electrical power is conducted to a motor stator 64. Electric motor permanent magnets 68 are included about the outer perimeter of the wheel portion 20 of the gyroscope wheel 18 and at an inner portion of the motor stator 64 to drive rotation of the gyroscope wheel 18.

Figure 6:
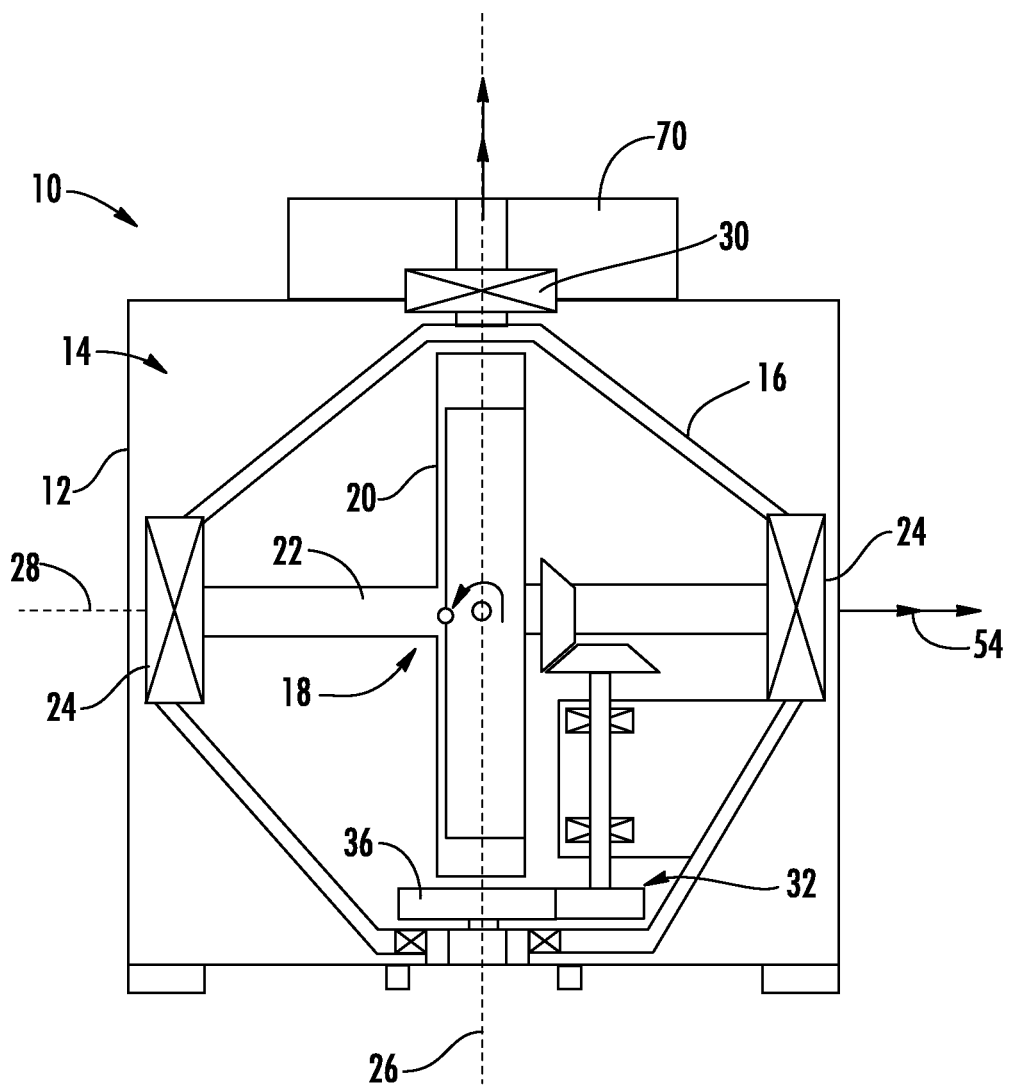
FIG. 6 is the vibration control assembly according to yet another embodiment.

Referring now to FIG. 6, an embodiment of the vibration control assembly 10 is shown with a single motor 70 driving rotation of the cage 16 and the gyroscope wheel 18. In this embodiment, the sun gear 36 does not rotate which allows the gyroscope wheel 18 to be driven when the gyroscope wheel 18 is precessed, thereby avoiding the need for a rotating motor directly connected to the gyroscope wheel 18 to spin the gyroscope wheel 18, as well as obviating the need for slip rings to power such a motor. The single motor 70 drives the gyroscope wheel 18 at a constant rotational speed in such an embodiment.

Irrespective of the precise configuration of the vibration control assembly 10, it is to be appreciated that a single assembly may be included or a plurality of vibration control assemblies may be included. For example, two or four vibration control assemblies are provided in some embodiments.

Referring now to FIGS. 9-12, a control assembly 200 for any of the embodiments of the vibration control assembly 10 is illustrated in two positions and therefore two different operating conditions of the vibration control assembly 10. As described herein, the control assembly 200 varies the angle of one or more components of the vibration control assembly 10 to control the amount of counter-vibration that the vibration control assembly 10 provides.

The control assembly 200 includes a structure 202 that surrounds all or a portion of the vibration control assembly 10. In the illustrated embodiment, the structure 202 is a dome-like structure, but it is to be understood that alternative geometries are contemplated. The structure 202 includes an inner surface 204 that has a track 206 extending therealong. The track 206 may be built on the inner surface 204 or may be defined as a recess within the inner surface 204. In the illustrated embodiment, the track 206 is oriented in a spiral configuration, but it is to be understood that the illustrated spiral configuration is merely illustrative and is not limiting. In particular, it is contemplated that the track 206 may extend along the inner surface 204 in a linear manner, curvilinear manner or some other angular orientation.

Figure 11:
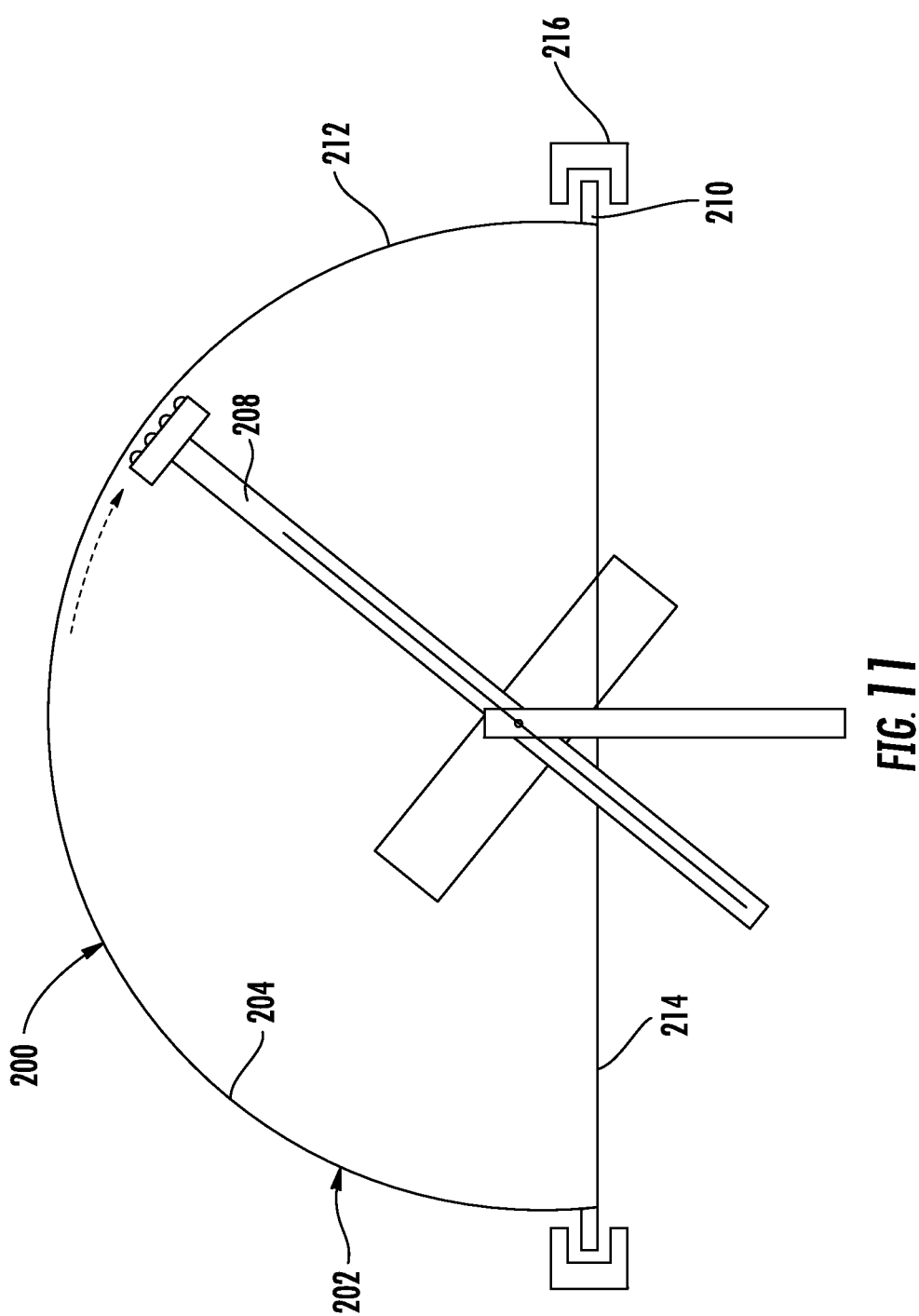
FIG. 11 is a side view of the control assembly illustrating the gyroscope wheel in a second position.
Figure 12:
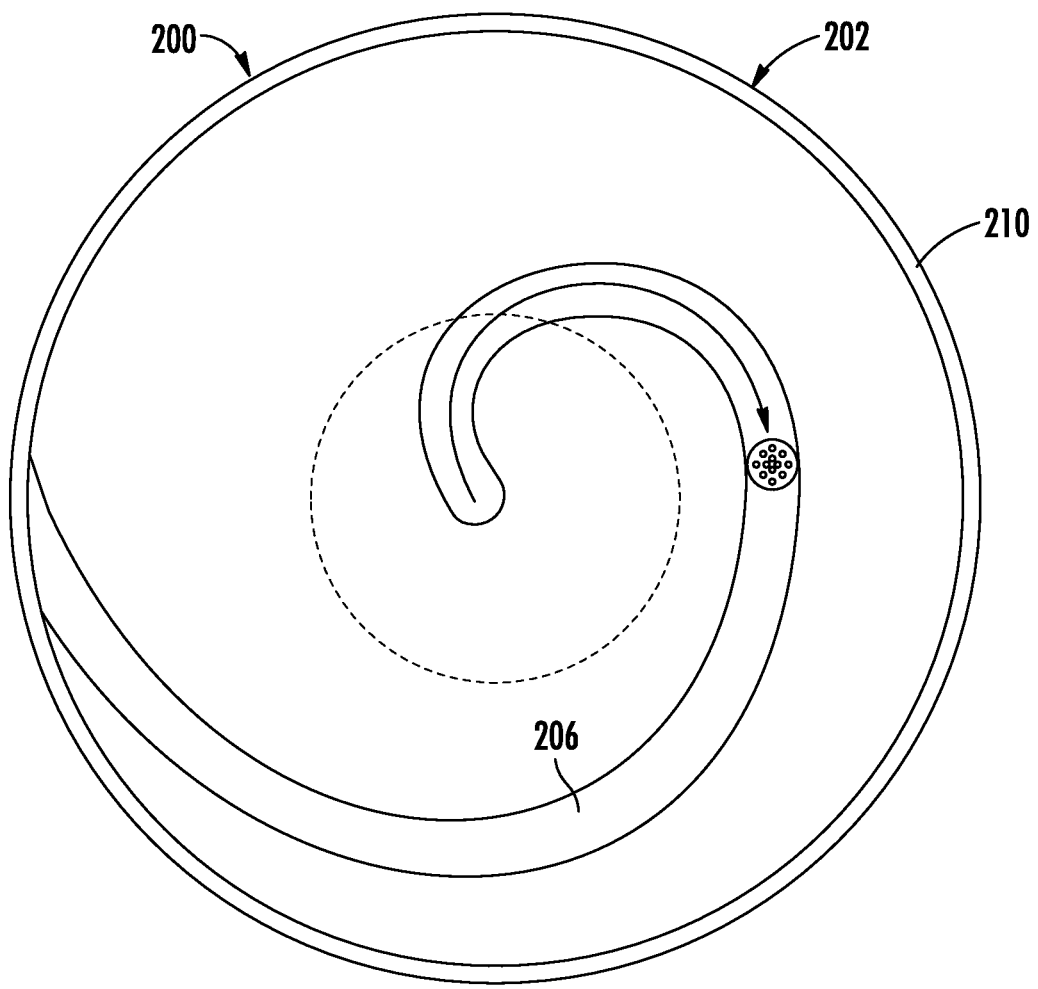
FIG. 12 is a top view of the control assembly illustrating the gyroscope wheel in the second position.

The track 206 is sized to receive an end of an arm 208 therein. The arm 208 is operatively coupled to the vibration control assembly 10. In the illustrated embodiment, the arm 208 is operatively coupled to the gyroscope wheel 18 (may also be referred to as a gimbal). The structure 202 is configured to spin in a synchronous manner with the gyroscope wheel 18. As shown, in FIGS. 9 and 10, the gyroscope wheel 18 is disposed in a first angular position (e.g., horizontal) when the arm 208 is disposed in a top, central location of the track 206. The relative rotational rates of the gyroscope wheel 18 and the structure 202 may cause the arm 208 to translate along the track 206. Translation of the arm 208 along the track 206 causes a change in rotational angle of the gyroscope wheel 18. FIGS. 11 and 12 illustrate the gyroscope wheel 18 in a different angular position when compared to FIGS. 9 and 10.

The track 206 is formed of a material that has a coefficient of friction that is low enough to facilitate reliable translation of the arm 208 to avoid sticking. Alternatively, the track 206 may be coated with a low-friction material. In yet another alternative, the end of the arm 208 may be formed of, or coated with, a low-friction material. Additionally, both the end of the arm 208 and the track 206 may include low-friction material.

The structure 202 also includes a fin or the like 210 extending from an outer surface 212 of the structure 202. In the illustrated embodiment, the fin 210 is located proximate a base 214 of the structure 202. The fin 210 may extend completely about the circumference of the base or only along a portion thereof. A braking mechanism 216 is disposed in close proximity with the fin 210, such as the surrounding configuration that is illustrated. The braking mechanism 216 engages the fin 210 in a controllable manner to exert a braking force on the structure 202 to slow rotation of the structure. The braking force allows an operator or controller to "dial in" the amount of counter vibration that the vibration control assembly 10 imposes based on the angular orientation of the gyroscope wheel 18. In some embodiments, the angular orientation of the gyroscope wheel 18 is moveable over a 90 degree range, such as from a horizontal orientation to a vertical orientation.

The braking mechanism 216 may be part of an electric, regenerative braking system that is used to store energy that may be employed to power the vibration control assembly 10.

Figure 5:
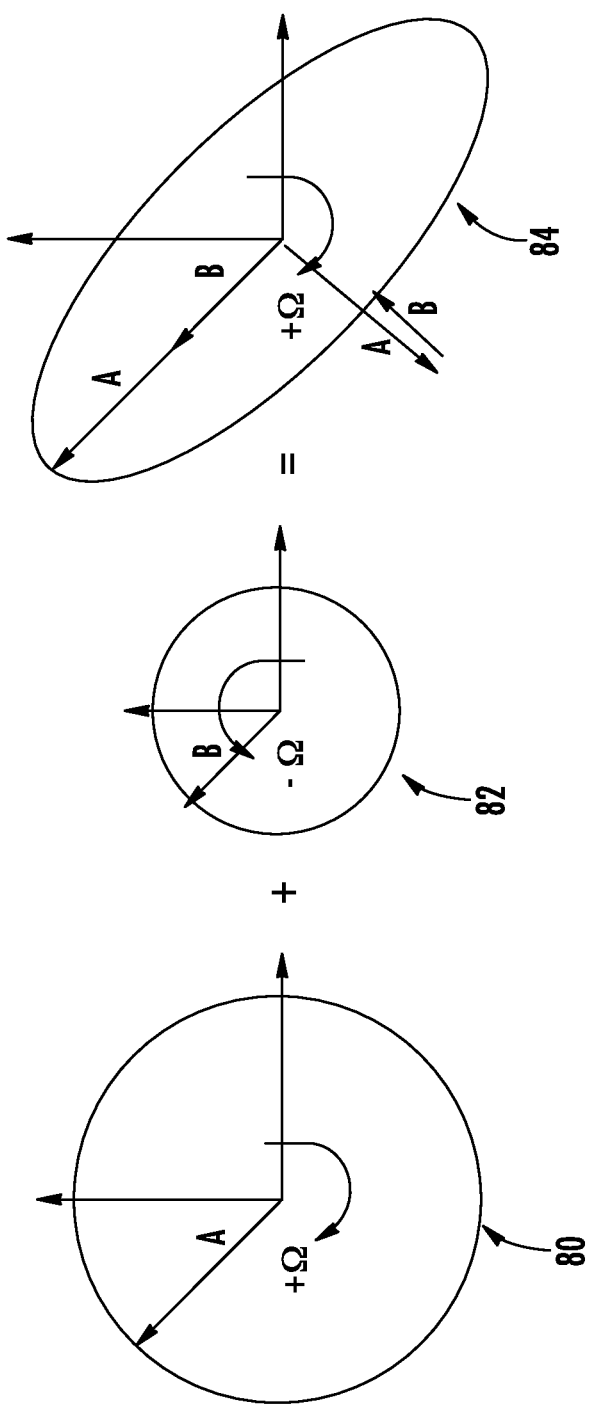
FIG. 5 illustrates instantaneous moment vectors of two vibration control assemblies and their summed moment path to counter vibratory moments.

Referring to FIG. 5, the physics and dynamics of the resultant moments imposed on the structure by two vibration control assemblies is illustrated at an instantaneous moment of time. Assuming that the gyroscope disks are rotating in the same direction, two assemblies (i.e., gyroscope wheels) that are forced to precess in opposite directions at a desired vibration-suppression frequency can be used to counter the undesirable moments produced by the structure (e.g., vehicle). A vibration control assembly 80 is controlled to precess in the clockwise direction at an angular speed of $+\Omega$ to produce a moment vector A. Vibration control assembly 82 is controlled to precess in the counterclockwise direction at an angular speed of $-\Omega$ to produce a moment vector B. Each produces a circular rotating moment vector A, B, with both vectors rotating or processing at the frequency of the undesired vehicle vibration frequency. By various combinations of moment vector size (i.e., magnitude) and phase, any vibratory pitching or rolling moment ellipse 84, at any "tilt" may be produced. Advantageously, the resulting ellipse (including a circle) may be adjusted to counter the moment produced by the structure to result in a zero net moment on the structure, thereby producing extremely low vibration.

Referring to FIG. 7, a case where four vibration control assemblies are employed is illustrated. Such embodiments may be beneficial where the gyroscope wheel 18 rotates at a nearly constant speed, such as in the embodiments described in FIGS. 2 and 6, for example. In the illustration, four assemblies are represented with wheel speed designed to have spin speeds that are fixed ratios of the gearbox in the example of FIG. 2. As a result, vibratory moments A, S, B and U are all the same size. Two of the assemblies are made to precess in the same direction at the same speed (−Ω), but the precession angular position of the respective gyroscope wheels are selected such that moment vector A and moment vector S vectorially add so that the result is the desired moment T. Similarly, the other two assemblies are phased to produce net moment vector V through the vector addition of moment vector B and moment vector U. These two assemblies are made to precess in the opposite direction from the other two assemblies, but at the same speed (i.e., in the direction and precession speed +Ω. The two circular moments rotating in opposite directions vectorially add to produce an elliptical moment pattern that may be controlled.

A single gyroscope of variable disk speed or two gyroscopes with constant disk speed may also be advantageous on a vehicle that exhibits a dominant, undesirable ambient vibration moment that is nearly circular. This is an arrangement that is particularly advantageous when it is desired to minimize vehicle weight at the cost of higher vibrations.

Advantageously, effective anti-vibration is achieved at a reduced weight requirement for assemblies employed to do so. The vibration control assembly, or assemblies, efficiently generate large anti-rotation moments by spinning the gyroscope wheel 18 faster, rather than increasing the travel of a linear-type actuator or the distance between linear-type actuators.

Figure 8:
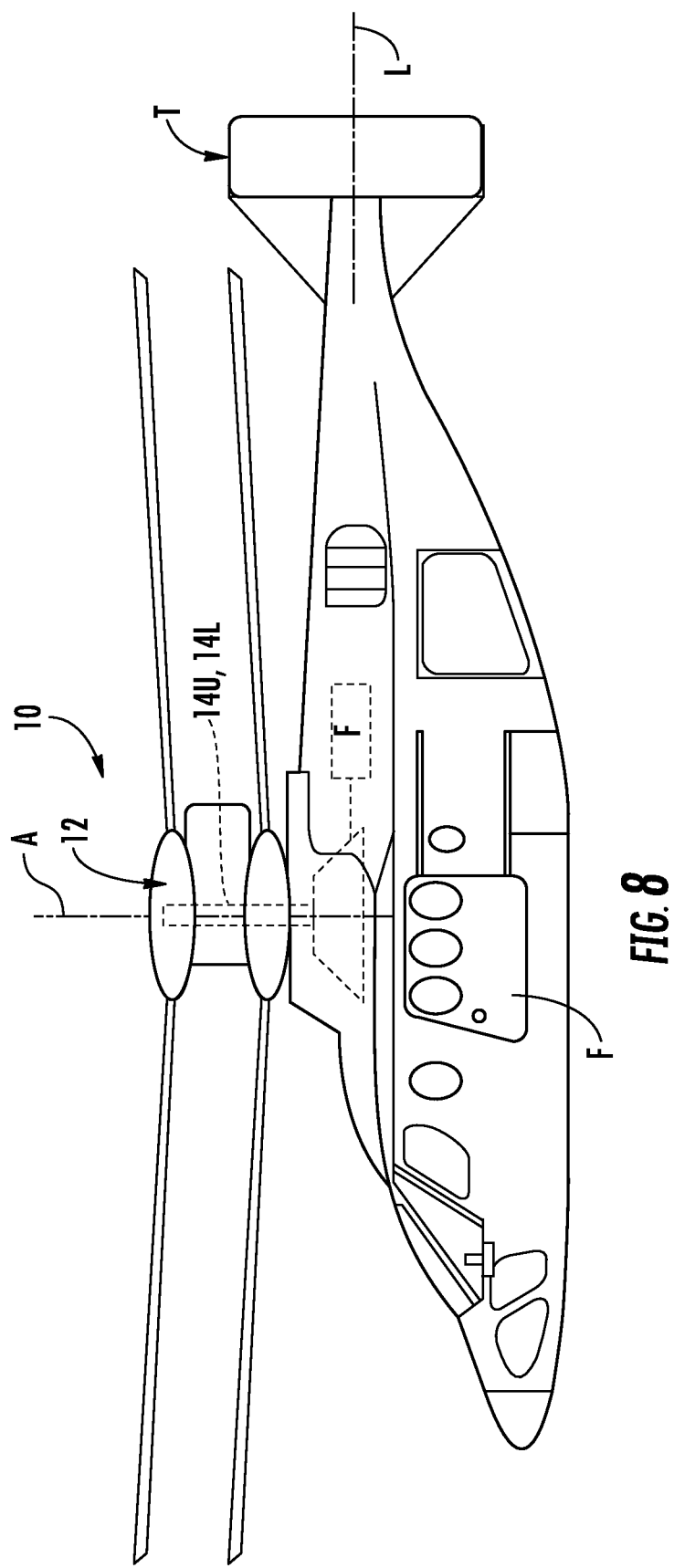
FIG. 8 illustrates an aircraft using the vibration control assembly according to an embodiment.
Figure 9:
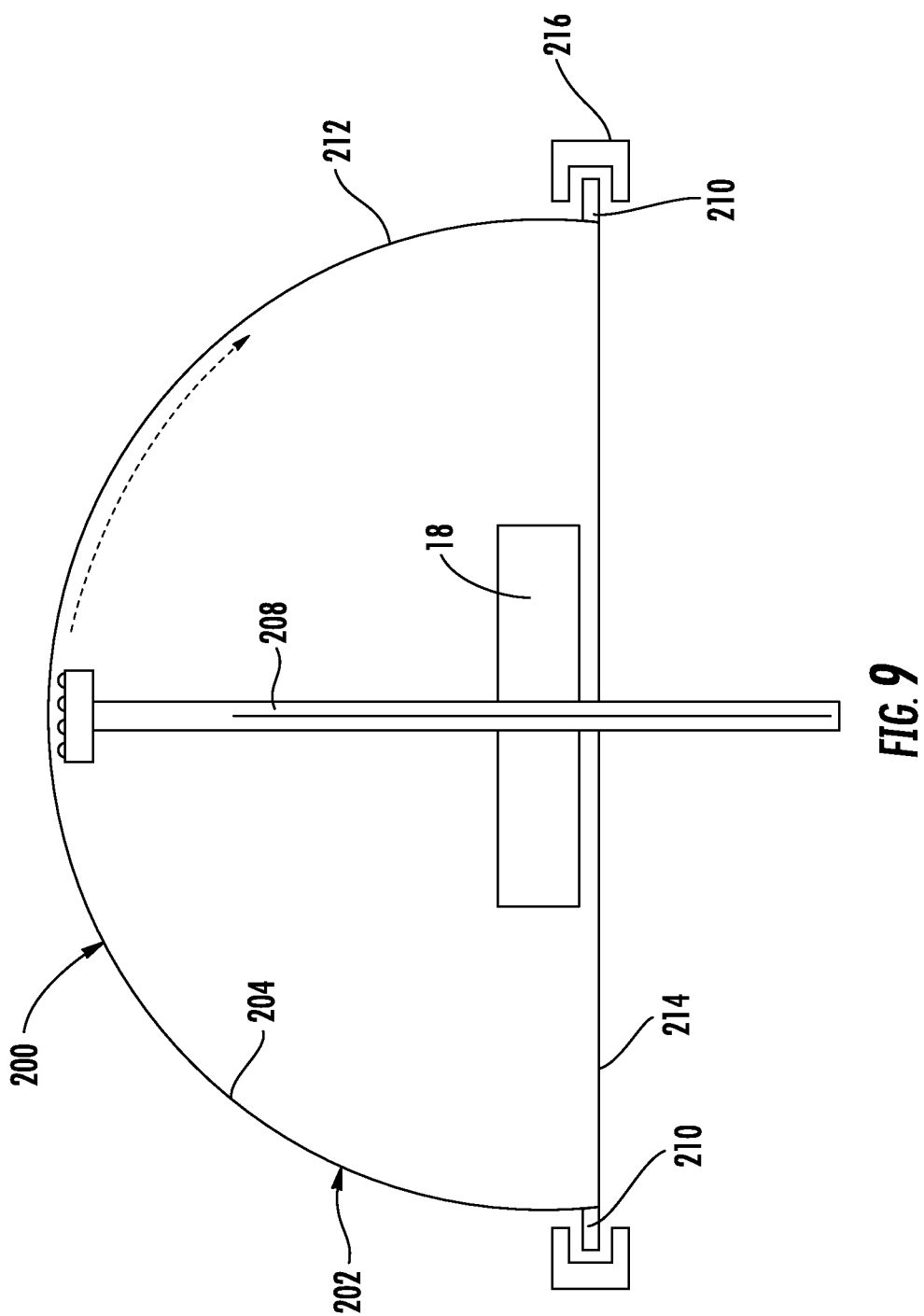
FIG. 9 is a side view of a control assembly for the vibration control assembly, illustrating a first position of a gyroscope wheel.
Figure 10:
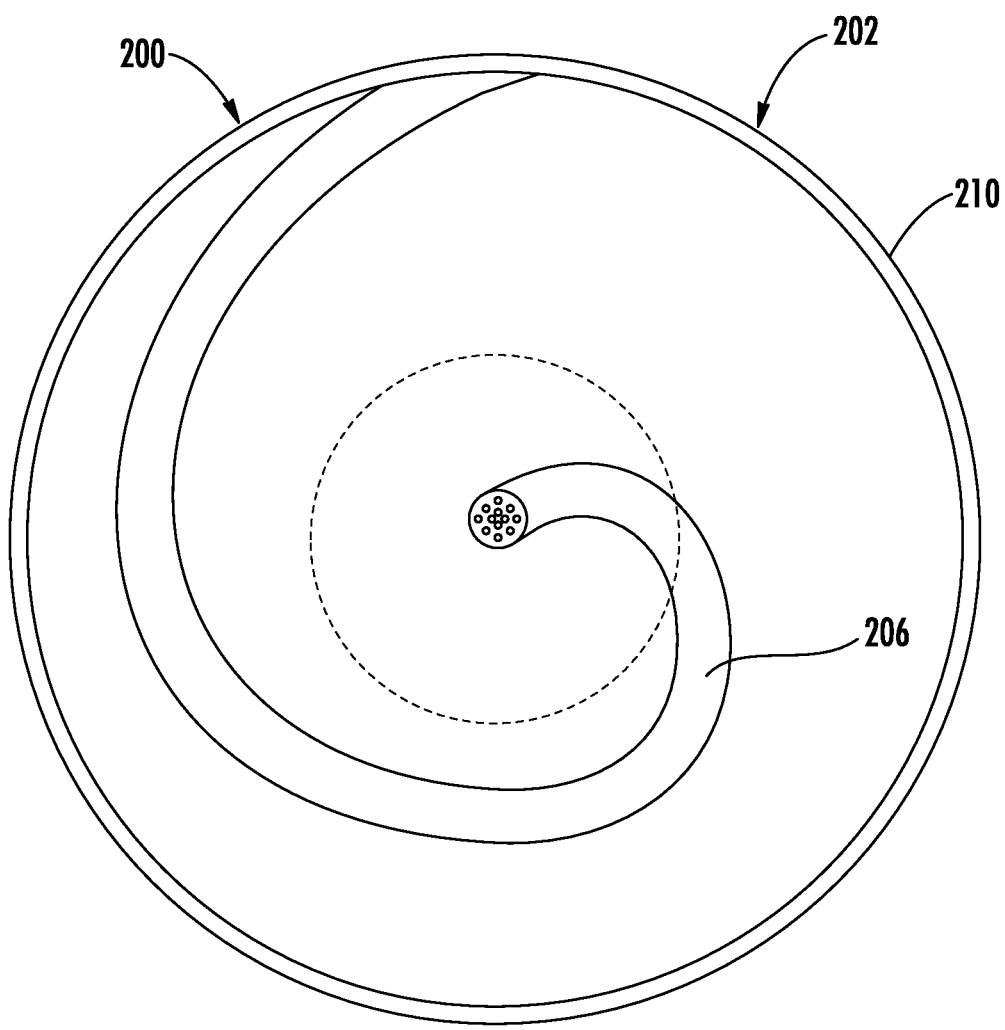
FIG. 10 is a top view of the control assembly illustrating the gyroscope wheel in the first position.

FIG. 8 illustrates an aircraft using the vibratory control assembly according to an embodiment. In particular, a rotary-wing aircraft 100 having a dual, counter-rotating, coaxial rotor system 102 which rotates about a rotating main rotor shaft 14U, and a counter-rotating main rotor shaft 14L both about an axis of rotation A. The aircraft 100 includes an airframe F which supports the dual, counter rotating, coaxial rotor system 102 as well as an optional translational thrust system T which provides translational thrust during high speed forward flight generally parallel to an aircraft longitudinal axis L. Although a particular aircraft configuration is illustrated in the disclosed embodiment, other counter-rotating, coaxial rotor systems will also benefit from the present invention.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. By way of example, aspects can be used in conventional and/or coaxial rotary aircraft, fixed wing aircraft, maritime applications, industrial machinery, automotive applications, or other applications where vibrations need to be reduced. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A vibration control assembly for an aircraft comprising:
a housing operatively coupled to the aircraft;
a cage disposed within an interior region of the housing, the cage rotatable within the housing about a first axis;
a gyroscope wheel disposed within the cage and rotatable about a second axis other than the first axis, wherein a controllable moment is imposed on the aircraft upon rotation of the gyroscope wheel to counter vibratory moments produced by the vehicle; and
a control assembly at least partially surrounding the gyroscope wheel for controlling the controllable moment, the control assembly comprising:
a structure having an inner surface;
a track disposed along the inner surface; and
an arm operatively coupled to the gyroscope wheel, the arm having an end disposed within the track, the gyroscope wheel angularly displaceable upon translation of the arm along the track.

2. The vibration control assembly of claim 1, wherein the structure comprises a domed geometry.

3. The vibration control assembly of claim 1, wherein the structure rotates synchronously with the gyroscope wheel.

4. The vibration control assembly of claim 1, wherein the track extends along the inner surface of the structure in a spiral path.

5. The vibration control assembly of claim 1, wherein the gyroscope wheel is angularly displaceable over a 90 degree range.

6. The vibration control assembly of claim 1, wherein the control assembly further comprises:
a fin extending from an outer surface of the structure; and
a braking mechanism disposed proximate the fin and engageable therewith to control a rotational speed of the structure.

7. The vibration control assembly of claim 6, wherein the fin extends around at least a portion of a base of the structure.

8. The vibration control assembly of claim 6, wherein the braking mechanism is an electric braking mechanism and is a regenerative brake that is configured to store energy during braking.

9. The vibration control assembly of claim 8, further comprising a motor operatively coupled to the cage with a motor shaft to rotate the cage and to control precession of the vibration control assembly.

10. The vibration control assembly of claim 9, wherein the motor is operatively coupled to the gyroscope wheel and drives rotation of the gyroscope wheel.

11. The vibration control assembly of claim 9, wherein the motor is at least partially powered by energy generated by the regenerative brake of the braking mechanism.

12. A method of controlling vibration on an aircraft comprising:
rotating a cage about a cage axis, the cage disposed within a housing;
rotating a gyroscope wheel about a gyroscope wheel axis that is non-parallel to the cage axis, the gyroscope wheel disposed within the cage;
producing a moment on the aircraft upon rotating the gyroscope wheel, wherein the cage and gyroscope wheel partially form a first vibration control assembly; and controlling the moment produced by controlling an angular orientation of the gyroscope wheel,
wherein the angular orientation of the gyroscope wheel is controlled by translating an arm operatively coupled to the gyroscope wheel along a track formed along an inner surface of a structure that partially surrounds the gyroscope wheel.

13. The method of claim 12, wherein the structure and the gyroscope wheel are rotated synchronously.

14. The method of claim 12, wherein the rotational speed of the structure is controlled with a braking mechanism that applies a braking force to the structure.

15. The method of claim 14, wherein a power source is provided power with energy generated by the braking force applied to the structure.

16. The method of claim 12, further comprising controlling the moment produced on the aircraft by varying a rotational speed of the gyroscope wheel.

17. The method of claim 12, wherein the track has a spiral configuration.

18. The method of claim 12, wherein the structure includes a fin located proximate a base of the structure, and wherein the fin is configured to extend from an outer surface of the structure.

19. The method of claim 12, wherein at least one of the track or the arm is coated with a low-friction material.

* * * * *